United States Patent Office 3,713,019
Patented Jan. 23, 1973

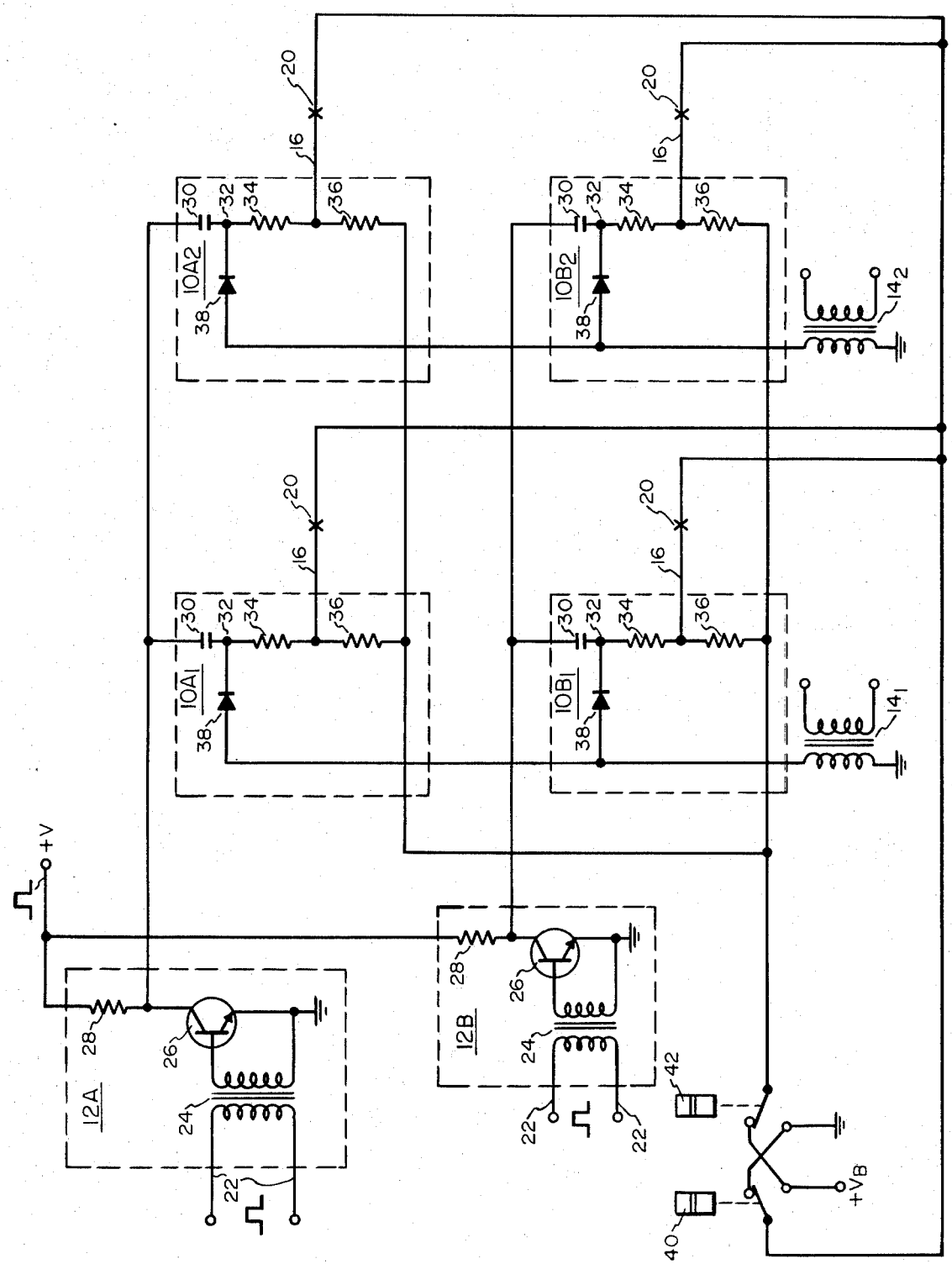

3,713,019
ELECTRONIC SCANPOINT MATRIX HAVING MEANS FOR DETECTING ELECTRICAL FAILURES THEREIN
John G. van Bosse, Mount Prospect, Ill., assignor to GTE Automatic Electric Laboratories, Incorporated, Northlake, Ill.
Filed Aug. 5, 1971, Ser. No. 169,394
Int. Cl. G01r 31/02
U.S. Cl. 324—51                        7 Claims

ABSTRACT OF THE DISCLOSURE

An electronic scanpoint matrix of the resistor-capacitor-diode type for supervision of a plurality of signal lines has one side of each signal line and each scanpoint selectively coupled in common via relay contacts to a source of biasing voltage or ground. The relay contacts are operated to selectively apply a biasing voltage or ground potential to the scanpoints and signal lines to provide a matrix output which is representative of electrical failures in driver transformers, driver transistors, scanpoint capacitors, scanpoint diodes or sense line output transformers.

BACKGROUND OF THE INVENTION

Field of the invention

The present invention relates generally to the field of electronic scanning matrices and more particularly to an electronic scanpoint matrix having a provision for detecting electrical failures in the components thereof.

Description of the prior art

Prior to the present invention scanpoint matrices including arrays of scanpoints comprising an input capacitor, voltage divider and output diode were known in the art and had been found to be generally acceptable in telephone systems for supervising the states of signal lines. Due to the very large number of lines to be supervised the scanpoint matrices generally become quite large in terms of number of electrical components and points of potential failure are therefore many. To manually test each component in the scanpoint matrix at a sufficient frequency to assure reliable operation becomes a most difficult task and it is thus desirable to incorporate self-test provisions in the matrix.

OBJECTS AND SUMMARY OF THE INVENTION

From the foregoing discussion it will be understood that among the various objectives of the present invention are included the following:

To provide a new and novel electronic scanpoint matrix having means for detection and isolation of electrical failures occurring therein; and To provide apparatus of the above-described character involving a minimum of structural addition and modification of the scanpoint matrix.

These and other objectives of the present invention are efficiently achieved by providing an electronic scanpoint matrix of the resistor-capacitor-diode type having one side of each signal line to be supervised coupled selectively in common through a first relay to a source of biasing potential or ground potential. Each scanpoint is coupled in a like manner through a second relay to a like biasing or ground potential. For normal matrix operation the signal lines are grounded and a bias voltage is applied to the scanpoints. For testing, however, the scanner is operated with the relays selectively operated in opposition and the output monitored to indicate the location and nature of electrical failures occurring in the scanpoint matrix.

The foregoing as well as other objects, features and advantages of the present invention will become more apparent from the following detailed description taken in conjunction with the appended drawing.

BRIEF DESCRIPTION OF THE DRAWING

The single appended drawing is a schematic diagram of an improved electronic scanpoint matrix constructed in accordance with the principles of the present invention.

DESCRIPTION OF THE PREFERRED EMBODIMENT

With reference now to the figure, there is illustrated a 2 x 2 scanpoint matrix incorporating the improvement of the present invention. An array of scanpoints, $10A_1$, $10A_2$, $10B_1$, and $10B_2$ is arranged in electrical rows and columns and each scanpoint in a row is coupled in parallel to an associated row driver 12A and 12B. Scanpoints in each column are coupled in parallel to an associated sense line output transformer $14_1$ and $14_2$. Each scanpoint is coupled to a signal line 16 to be supervised. In telephone system applications the signal lines generally include a relay although in other types of systems transistor switches or other selectively conductive elements are involved and are schematically illustrated as contacts 20. Each row driver 12, scanpoint 10 and output transformer 14 is respectively identical in structure and operation.

In normal operation each signal line is maintained at ground potential and a bias voltage is applied to each scanpoint. An input control pulse is applied to the input terminals 22 of a row driver 12 selected by means external to the scanpoint matrix. The input control pulse is coupled to a pulse transformer 24, the secondary winding of which is coupled across the base and emitter of driver transistor 26, which is normally non-conducting. A source of D.C. potential, $+V$ is coupled via resistor 28 to the collector of transistor 26 in parallel with the row of scanpoints 10. Thus, when the input control pulse is applied to transistor 26, a negative going D.C. pulse is appiled to each scanpoint 10.

Each scanpoint 10 comprises an input capacitor 30 coupled between the row driver 12 and a scanpoint junction 32. A first resistor 34 is coupled to the junction 32 and in parallel to the signal line 16 being monitored and through a second resistor 36 to a source of D.C. potential, $+V_B$. A scanpoint output diode 38 has the cathode thereof coupled to the juntcion 32 and the anode coupled to the associated sense line output transformer 14. In this arrangement a selected scanpoint 10 will pass an interrogating pulse from a row driver 12 to a sense line output transformer 14 when the contact 20 in the supervised signal line 16 is closed. When the contact 20 is closed the potential existing at the scanpoint junction 32 is zero volt. The negative-going pulse from the row driver 12 causes the scanpoint junction potential to drop to $-V$ volts and this pulse is passed through the scanpoint output diode 38 to the sense line output transformer 14. When the contact 20 is open, however, the scanpoint junction 32 is at $+V_B$ volts and the negative-going row driver pulse drops this potential to $(V_B-V)$ volts. Assuming that $V_B$ is larger than V, the scanpoint junction potential remains positive, the scanpoint output diode 38 remains blocked and no signal is produced at the sense line output transformer 14.

In the practice of the present invention each signal line 16 being supervised is coupled in common to the armature spring of a first relay 40. In its unoperated state, relay 40 couples the signal lines 16 via the break contacts to ground potential and when operated couples these signal lines via the make contacts to the D.C. potential, +V_B. In a like manner the resistors 36 of each scanpoint 10 are coupled in common to the armature spring of a second relay 42 which in its idle state couples each scanpoint via the break contacts to the D.C. potential, +V_B. When relay 42 is operated the scanpoints 10 are coupled via the make contacts to ground potential.

As stated hereinabove, relays 40 and 42 are in their idle state during normal operation of the matrix and each scanpoint is coupled to the +V_B D.C. potential and each signal line is coupled to ground potential. For the purposes of testing the matrix for electrical failures, however, scanning may be performed with either relay 40 or 42 operated. When the properly operating matrix is scanned with relay 40 operated, no scanpoint 10 should respond since the steady state value of the scanpoint junction potential is +V_B regardless of the state of the contacts 20 in signal lines 16. Conversely, when the matrix is scanned while relay 42 is operated, all scanpoints should respond since the scanpoint junction potential is zero volt regardless of the state of contacts 20 in signal lines 16. The matrix may thus be scanned periodically with relays 40 and 42 selectively operated to locate a component which has failed and identify the nature of the failure.

When a scanpoint output diode 38 is shorted, that scanpoint will respond when interrogated while relay 40 is operated. This occurs because the short forces the scanpoint junction potential to zero volt since the resistance of the primary winding of the sense line output transformer 14 is much smaller than that of resistor 34. When relay 42 is operated and the matrix is scanned no scanpoint 10 in a row associated with a row driver 12 having an open or shorted transistor 26 or open transformer 24 will respond. Similarly all scanpoints 10 in a column associated with an open sense line output transformer will fail to respond. An open diode 38 or open capacitor 30 will cause that scanpoint to not respond when interrogated while relay 42 is operated. Finally, a shorted capacitor 30 will cause that scanpoint to not respond when interrogated while relay 42 is operated since the resistance of the shorted capacitor 30 is much less than that of resistor 34 and the steady state of the scanpoint junction potential remains positive and diode 38 remains blocked.

It will thus be seen that the present invention provides an improved scanpoint matrix with a means of electrical failure detection which is simple yet efficiently meets the objectives set forth hereinabove. Since certain changes in the above-described construction will occur to those skilled in the art without departure from the scope of the invention, it is intended that all matter contained in the description or shown in the appended drawing shall be interpreted as illustrative and not in a limiting sense.

Having described what is new and novel and desired to secure by Letters Patent, what is claimed is:

1. An improved electronic scanpoint matrix for monitoring the states of selectively operated electrical contacts in each of a plurality of signal lines, said matrix comprising an array of scanpoints arranged in electrical rows and columns, each said scanpoint including a scanpoint junction, an input capacitor coupled to said junction, a scanpoint diode having the cathode thereof coupled to said junction, a first resistor coupled between said junction and one side of said contacts in said signal line, and a second resistor coupled to said first resistor and to said signal line;

a first source of D.C. potential;

means coupled to the input capacitor of each scanpoint in a row of said array for selectively coupling negative going pulses from said first source of D.C. potential to each said scanpoint input capacitor;

output means coupled to the anodes of each said scanpoint diode in a column of said array;

said scanpoint diodes operating to coupled pulses of D.C. potential from said scanpoint junction to said output means when the potential of said scanpoint junction is negative and to block said pulses when the potential of said scanpoint junction is positive;

a second source of D.C. potential relatively more positive than said first source of D.C. potential;

first means coupled to said second resistor of each said scanpoint for selectively coupling said scanpoints to either of said second source of D.C. potential and to ground potential;

second means coupled to the side of each of said signal lines opposite said scanpoints for selectively coupling said signal lines to either of ground potential and said second source of D.C. potential;

selective operation of said first coupling means operating to couple each said scanpoint to ground potential such that said scanpoint diodes couple said pulses of D.C. potential from said scanpoint junction to said output means regardless of the state of said contacts in said signal lines, the failure of said pulses to be coupled from a given scanpoint to said output means indicating a failure in the scanpoint matrix; and selective operation of said second coupling means operating to couple each said scanpoint to said second source of D.C. potential such that said scanpoint diodes block said pulses of D.C. potential from said scanpoint junction regardless of the state of said contacts in said signal lines, the coupling of said pulses from a given scanpoint to said output means indicating an electrical failure in the scanpoint matrix.

2. Apparatus as recited in claim 1 wherein said first selective coupling means comprises an electromagnetic relay having an armature spring coupled to each of said second resistors, a break contact coupled to said second source of D.C. potential, and a make contact coupled to ground potential.

3. Apparatus as recited in claim 1 wherein said second selective coupling means comprises an electromagnetic relay having an armature spring coupled to each of said signal lines, a break contact coupled to ground potential, and a make contact coupled to said second source of D.C. potential.

4. A method of testing an electronic scanpoint matrix of the type including an array of resistor-capacitor-diode scanpoints arranged in electrical rows and columns, each said scanpoint coupled to selectively operated electrical contacts in a signal line to be monitored, a row driver coupled to each scanpoint in a row of said array for selectively applying negative going pulses of D.C. potential thereto, and an output means coupled to each scanpoint in a column of said array, each said scanpoint being normally responsive to pass an applied pulse of negative doing D.C. potential to said output means only when said signal line contacts are closed, said method comprising the steps of coupling said scanpoints and said signal lines to ground potential, applying a negative going pulse of D.C. potential in sequence to each said row of scanpoints in said array, and determining which of the scanpoints in each column of said array fail to respond with an output pulse on the application of said applied pulse, such failure to respond being indicative of the electrical failure of a component of said matrix.

5. The method recited in claim 4 further including the steps of coupling said scanpoints and said signal lines to a source of D.C. potential more positive than said pulses of D.C. potential, applying a negative going pulse of D.C. potential in sequence to each said row of scanpoints in said array, and determining which of the scanpoints in each column of said array respond with an output pulse on the application of said applied pulse, such response being indicative of the electrical failure of a component of said matrix.

6. The method recited in claim 4 wherein failure of all scanpoints in a row of said array to respond to the application of said negative going pulse of D.C. potential is indicative of a failure in said row driver, failure of all scanpoints in a column of said array to respond to the application of said negative going pulse of D.C. potential is indicative of a failure in said output means, and failure of a given scanpoint in said array to respond to the application of said negative going pulse of D.C. potential is indicative of the failure of an electrical component of that scanpoint.

7. The method recited in claim 5 wherein the response of a given scanpoint in said array to the application of said negative going pulse of D.C. potential is indicative of the failure of an electrical component of that scanpoint.

References Cited

UNITED STATES PATENTS

| | | | |
|---|---|---|---|
| 3,460,092 | 8/1969 | Davidson et al. | 340—166 R |
| 3,532,976 | 10/1970 | Adelaar et al. | 340—166 R X |
| 3,590,369 | 6/1971 | Wainwright | 324—51 |
| 3,604,860 | 9/1971 | Buchhelt | 340—166 R |
| 3,609,546 | 9/1971 | Magnusson et al. | 324—51 X |
| 3,646,368 | 2/1972 | Mills | 324—51 X |

GERRAD R. STRECKER, Primary Examiner

U.S. Cl. X.R.

324—52, 73; 340—166

UNITED STATES PATENT OFFICE
CERTIFICATE OF CORRECTION

Patent No. 3,713,019       Dated January 23, 1973

Inventor(s) JOHN G. VAN BOSSE

It is certified that error appears in the above-identified patent and that said Letters Patent are hereby corrected as shown below:

Title Page: Delete: , (comma) after Laboratories

Column 4, line 53, "doing" should be -- going --

Signed and sealed this 29th day of May 1973.

(SEAL)
Attest:

EDWARD M. FLETCHER, JR.
Attesting Officer

ROBERT GOTTSCHALK
Commissioner of Patents